(12) United States Patent
Konishi et al.

(10) Patent No.: US 6,693,393 B2
(45) Date of Patent: Feb. 17, 2004

(54) BALLAST FOR A DISCHARGE LAMP

(75) Inventors: Hirofumi Konishi, Osaka (JP);
Toshiaki Nakamura, Osaka (JP);
Takashi Kambara, Osaka (JP); Miki Kotani, Osaka (JP); Toshifumi Tanaka, Osaka (JP)

(73) Assignee: Matsushita Electric Works, Ltd., Kadoma (JP)

( * ) Notice: Subject to any disclaimer, the term of this patent is extended or adjusted under 35 U.S.C. 154(b) by 0 days.

(21) Appl. No.: 10/221,167

(22) PCT Filed: Jan. 10, 2002

(86) PCT No.: PCT/JP02/00084

§ 371 (c)(1),
(2), (4) Date: Sep. 18, 2002

(87) PCT Pub. No.: WO02/056645

PCT Pub. Date: Jul. 18, 2002

(65) Prior Publication Data

US 2003/0111969 A1 Jun. 19, 2003

(30) Foreign Application Priority Data

Jan. 12, 2001 (JP) .......................................... 2001-005704
Jul. 16, 2001 (JP) .......................................... 2001-215722

(51) Int. Cl.$^7$ ............................................. H05B 37/02
(52) U.S. Cl. ...................................... 315/224; 315/308
(58) Field of Search ................................. 315/224, 225, 315/307, 308, 244, 247, 276, 291, 209 R

(56) References Cited

U.S. PATENT DOCUMENTS

| 5,485,061 | A |   | 1/1996 | Hanazaki et al. ........... 315/307 |
| 5,680,017 | A |   | 10/1997 | Veldman et al. ............ 315/308 |
| 5,969,484 | A | * | 10/1999 | Santi et al. .................. 315/247 |
| 6,049,179 | A |   | 4/2000 | Kisaichi et al. ............. 315/307 |
| 6,504,315 | B2 | * | 1/2003 | Kim .............................. 315/224 |
| 6,552,501 | B2 | * | 4/2003 | Ito et al. ..................... 315/308 |

FOREIGN PATENT DOCUMENTS

| DE | 44 28 850 | 2/1995 |
| JP | 11-260584 | 9/1999 |

* cited by examiner

*Primary Examiner*—Wilson Lee
(74) *Attorney, Agent, or Firm*—Oblon, Spivak, McClelland, Maier & Neustadt, P.C.

(57) ABSTRACT

A ballast for a discharge lamp includes a DC-DC converter which provides a regulated DC output so as to start and keep operating the lamp. A controller is included to give a closed-loop control for regulating the DC output based upon a monitored DC output. The controller also provides an open-loop control which interrupts the closed-loop control for a limited period immediately after the initiation of the lamp discharge in order to supplement a sufficient lamp current which would not expected with the closed-loop control, thereby successfully complementing the lamp start and proceeding to the stable lamp operation.

19 Claims, 8 Drawing Sheets

BALLAST FOR A DISCHARGE LAMP

TECHNICAL FIELD

The present invention relates to a ballast for a discharge lamp such as a high intensity discharge (HID) lamp, and more particularly to an electronic ballast including a DC-DC converter which derives an input DC voltage from a DC voltage source such as a battery to provide a high DC voltage for operating the lamp, and also relates to a method of operating the discharge lamp with the use of the DC-DC converter.

BACKGROUND ART

As disclosed in Japanese Patent Early Publication No. 11-260584, a typical electronic ballast for the HID lamp is known to include a DC-DC converter providing an increased DC output, and an inverter which converts the DC output into an AC power for driving the lamp. The DC-DC converter includes a switching element which is driven to repetitively interrupt an input DC voltage to regulate the resulting DC output. Also included in the ballast is a controller which monitors the DC output and varies the duty of the switching element of the DC-DC converter based on the monitored DC output in order to regulate the DC output in a closed-loop control, thereby generating a starting voltage as well as a maintaining voltage to start and keep operating the lamp in accordance with the condition of the lamp.

In order to turn on the lamp, the DC-DC converter is firstly controlled to increase the output DC voltage to a starting voltage which is sufficiently high for initiating the discharge of the lamp after which the lamp is ignited to start the lamp. As soon as the lamp is started, i.e., an arc discharge is established, there is seen a rapid lowering of the output DC voltage associated with a corresponding lamp current lowering. This occurs in such a very short time that the closed-loop control is difficult to follow. As this result, the closed-loop control is likely to delay and rely still upon a high voltage around the starting voltage, thereby causing the DC-DC converter to generate only less amount of the lamp current, although the lamp just after having started will require a more amount of current for successfully proceeding into a stabilized lamp operation. That is, due to the delay in response of the closed-loop control at the very short transition period from the lamp start to the stable lamp operation, the DC-DC converter fails to supply sufficient amount of current to the lamp, which may sometimes cause an unintended extinction of the lamp.

DISCLOSURE OF THE INVENTION

In view of the above problem, the present invention has been achieved to provide an improved ballast for a discharge lamp which is capable of successfully proceeding the lamp start to the stable lamp operation without causing an unintended lamp extinction. The ballast in accordance with the present invention includes a DC-DC converter adapted to receive an input DC voltage from a DC voltage source. The DC-DC converter has a switching element which is driven to repetitively switch the input DC voltage so as to provide a DC output. Included in the ballast is a controller which monitors the DC output and provides a closed-loop control of varying the duty of the switching element based upon the monitored DC output in order to regulate the DC output such that the DC-DC converter provides a starting voltage of initiating a discharge of the discharge lamp as well as an operating voltage of keeping the lamp, operation. The characterizing feature of the present invention resides in that the controller provides an open-loop control which interrupts the closed-loop control to give a start-assisting period in which the switching element is controlled to turn on and off in a predetermined pattern to give DC output of a sufficient level for successfully complementing the lamp start. The start-assisting period is designed to start upon recognition that the DC output satisfies a first reference indicating that the discharging of the lamp is just started and to end upon recognition of a condition indicative of the completion of the starting of the lamp.

Accordingly, the open-loop control can provide sufficient amount of current to the lamp immediately after the starting of the lamp without a delay otherwise associated with the closed-loop control, thereby successfully complementing the lamp start and shifting the lamp to the stable lamp operation.

In a preferred embodiment, the controller is designed to terminate the start-assisting period after the elapse of a predetermined time from the beginning of the start-assisting period. The predetermined time is selected such that the current supplied from the DC-DC converter to the lamp sees no abrupt change when the closed-loop control regains immediately subsequent to the open-loop control.

The ballast may further include an input DC voltage monitor which monitors the input DC voltage supplied from the DC voltage source. The controller operates during the start-assisting period to decrease the on-period of the switching element as the monitored input DC voltage increases. With this arrangement, the DC-DC converter can supply the output of a suitable level irrespective of a possible variation in the input DC voltage, thereby successfully operating the lamp while the available input DC voltage is relatively low, while avoiding an excessive power from being applied to the lamp when the input DC voltage is relatively high, for protection of the lamp and the ballast.

Instead of or in combination with the above scheme of decreasing the on-period, the controller may increase the switching frequency of the switching element as the monitored input DC voltage increases, for the purpose of successfully operating the lamp while protecting the lamp as well as the ballast.

Preferably, the controller is designed to increase the on-period of the switching element with time during the start-assisting period such that a sufficient amount of current can be continuously fed to the lamp in match with the corresponding increase in the lamp voltage within the start-assisting period, thereby successfully completing the starting of the lamp. The on-period may increase in a stepwise manner or continuously.

Further, the ballast may include a lamp-off timer which measures an elapsed time after the discharge lamp is turned off. In this case, the controller is designed to increase the on-period of the switching element as the elapsed time decreases. That is, the shorter the time from the lamp's turn off to the lamp's re-start, more amount of current can be fed to the lamp for successfully re-starting the lamp. Speaking differently, the on-period is set larger as the re-start is made sooner after the lamp's turn off, thereby enabling to supply a sufficient amount of current for restarting the lamp in one hand. And, on the other hand, it is possible to reduce the current when the re-start is made longer after the lamp's turn off, thereby preventing an excess current from flowing through the lamp and the ballast for protection thereof.

Further, the ballast may include a memory which stores the monitored DC output updated during the start-assisting period so that the controller can rely upon the updated DC output as soon as the closed-loop control regains. With this result, the closed-loop control can use the updated value correctly indicative of the DC output during the start-assisting period for regulating the DC output consistently without suffering from a possible delay in response which would otherwise occur if the DC output is read after the termination of the open-loop control, thereby assuring a smooth transition from the lamp start to the stable lamp operation.

In a further preferred embodiment, the ballast includes a first detector which monitors an output level of the DC output and issues a first status signal indicating that the discharging of the lamp is just started when the output level satisfies the first reference, and a second detector which monitors the output level of the DC output and issues a second status signal indicating that the lamp is already started when the output level satisfies a second reference which is different from the first reference. When both of the first and second status signals are issued, the controller operates to make the open-loop control and the closed-loop control in sequence to regulate the DC output normally. On the other hand, when only the second status signal is issued, the controller responds to disable the open-loop control and makes only the closed-loop control. The closed-loop control in this case operates to generate a relatively low output as compared to that generated by the open-loop control, thereby providing a good basis for determining an abnormal condition of the ballast when the resulting DC output of the relative low level lowers below a low threshold.

When the both of the first and second status signal are issued, the controller responds to provide a first pattern of a power command upon which the closed-loop control relies to regulate the DC output. The first pattern defines the power command decreasing with time to a predetermined level such that the controller can supplement an optimum power to the successfully started lamp in accordance with the first pattern, thereby enabling to proceed the lamp into a subsequent run-up phase with a sufficient light output.

When only the second status signal issued, it may indicate the abnormal condition which results possibly from the ballast becoming partly defective due to short-circuiting or ground fault, for example, yet generating some output due to the presence of a certain circuit impedance. In this condition, the controller provides a second pattern of the power command upon which the closed-loop control relies to regulate the DC output. The second pattern defining the power command which is different and decreases to a predetermined level with time. The second pattern of the power command gives the low power command than the first pattern when the closed-loop control relies at the same time from the start of the closed-loop control. With the use of the second pattern, the DC output is lowered rapidly down below the low threshold, which enables immediate determination of the abnormal condition at the beginning of the closed-loop control not following the open-loop control, thereby protecting the ballast as well as the lamp without causing undue stresses to the circuit components of the ballast. The second pattern can be easily obtained by modifying the first pattern to accelerate the lowering of the power command. Alternatively, the second pattern may be defined as a fixed level not greater than a rated power level.

Preferably, the first reference is a voltage level of the DC output and is lower than a maximum DC voltage applied prior to starting the lamp, and the second reference is a voltage level which is lower than the first reference.

Further, the ballast may include an input current detector which monitors an input current flowing through the switching element. In this connection, the controller has a function of limiting the input current with reference to the monitored input current, and is capable of selecting a first upper limit for limiting the input current therebelow in the open-loop control and selecting a second upper limit which is lower than the first upper limit for limiting the input current therebelow in a rated lamp operation. With the introduction of the first upper limit in the open-loop control, it is made to protect the ballast and the lamp from an excessive current. The first upper limit may decrease with time during the start-assisting period so that a moderate current is supplied later within the start-assisting period to keep the lamp started in accordance with a lamp starting characteristic, yet eliminating unnecessary power. Also, the first upper limit may decrease as the monitored input DC voltage increases so as to provide an adequate amount of current to the lamp for successfully complementing the lamp start irrespective of a variation in the input DC voltage.

These and still other objects and advantageous features of the present invention will become more apparent from the following detailed description of the embodiments when taken in conjunction with the attached drawings

BEST MODES FOR CARRYING OUT THE INVENTION

A ballast for a discharge lamp of the present invention is particularly suitable for operating a high intensity head lamp of an automobile using a car battery as an input DC power source, although the present invention is not necessarily limited to this particular application and can be applied in general to lamp ballasts for discharge lamps.

Figure 1:
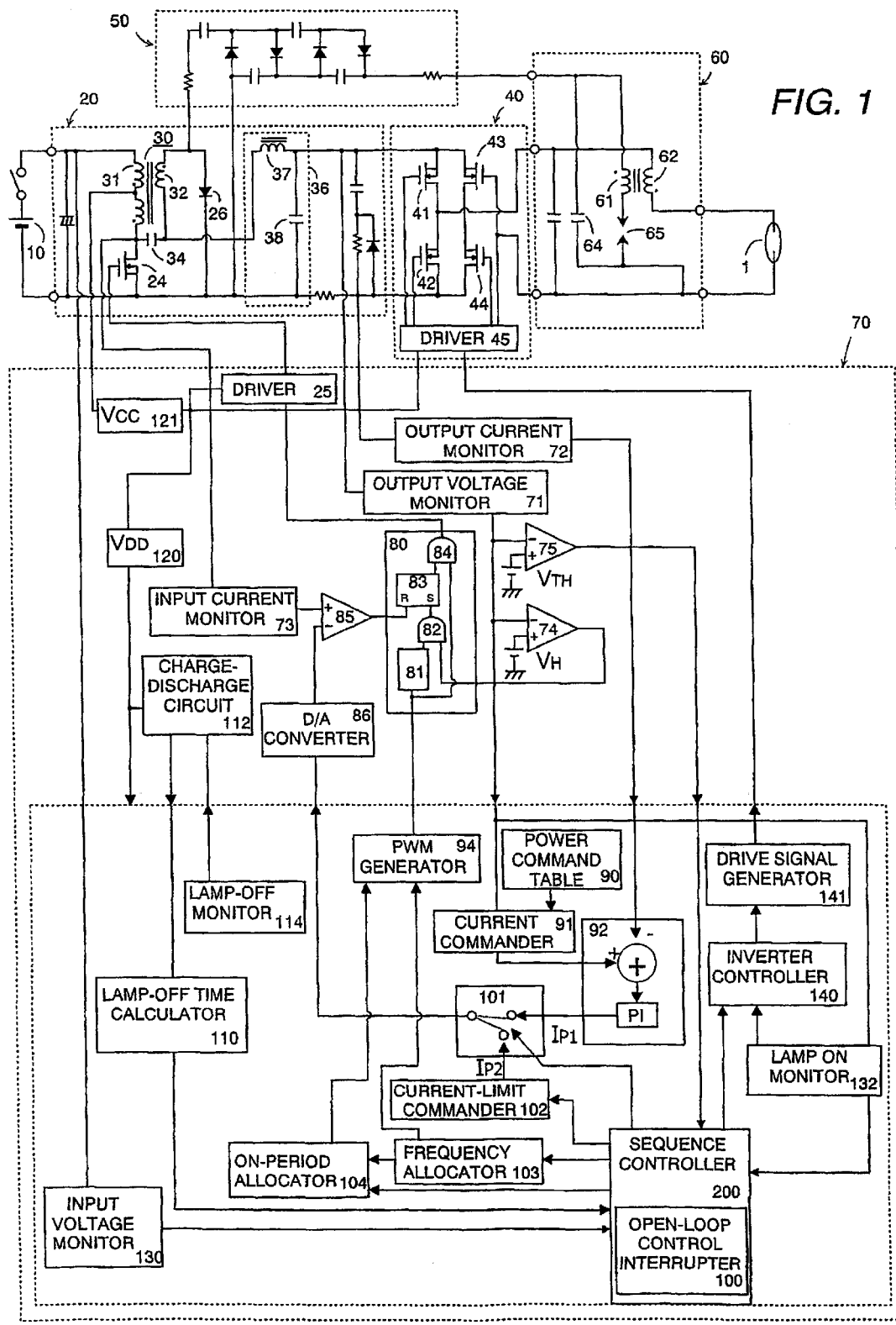
FIG. 1 is a circuit diagram illustrating a ballast for a high intensity discharge lamp in accordance with a first embodiment of the present invention.

Referring now to FIG. 1, there is shown the ballast in accordance with a first embodiment of the present invention.

The ballast is composed of a DC-DC converter 20 connected to receive an input DC voltage from the DC power source 10 such as a car battery for providing a regulated DC output, and an inverter 40 which converts the DC output into a low frequency AC power to be applied to a discharge lamp 1. Also included in the ballast are a booster 50 which derives a power from a portion of the DC-DC converter 20 to generate a boosted voltage, and an igniter 60 which produces from the boosted voltage an igniting voltage to be applied for igniting the lamp 1. The ballast further includes a controller 70 which controls the DC-DC converter 20 and the inverter 40 for starting the lamp and maintaining the lamp operation mainly based upon a monitored output DC power of the DC-DC converter 20.

The DC-DC converter 20 includes a transformer 30 and a switching element 24 connected in series with a primary winding 31 of the transformer 30 across the DC power source 10. The switching element 24 is controlled to repetitively turn on and off at varying frequencies and varying on-periods in order to accumulate an energy into the transformer 30 and a capacitor 34. When the switching element 24 is on, an input current flows from the DC power source 10 through primary winding 31 to store the energy therein. Capacitor 34 is connected between the primary winding 31 and a secondary winding 32, and in series relation with a diode 26 across the DC voltage source 10 so that, when the switching element 24 is off, another input current flows through the primary winding 31, the capacitor 34, the secondary winding 32, and the diode 26 to accumulate the energy in the windings 31 and 32 as well as in capacitor 34. The series combination of the diode 26 and the secondary winding 32 is connected across a low-pass filter 36 composed of an inductor 37 and a capacitor 38, i.e., an output to the inverter 40 such that, when the switching element 24 is off, the energy accumulated in secondary winding 32 is released through the diode 26 to provide an output DC voltage to the inverter 40. Also in this condition, the input current continues flowing through the primary winding 31, the capacitor 34, the secondary winding 32 and the diode 26 and back to the voltage source 10 in order to reduce an input current ripple. The capacitor 34 releases its energy while the switching element 24 is on to continue providing the output DC voltage to the inverter 40. The illustrated converter 20 is shown only for an exemplary purpose and may be configured differently provided that the like switching element is utilized to regulate the DC output. For example, known DC-DC converters of the fly-back type or the buck-boost type can be equally utilized.

The inverter 40 is of a full-bridge configuration having four switches 41, 42, 43 and 44 which are driven by a driver 45 to turn on and off in such a manner that one diagonally opposed pair of switches 41 and 44 are turn on and off alternately with the other diagonally opposed pair of switches 42 and 43 to provide a low frequency AC voltage for operating the lamp. The driver 45 is connected to receive a low frequency control signal from the controller 70 to make the low frequency inverter output. The driver 45 and a driver 25 for the switching element 24 of the converter 20 are energized by a voltage source 121 which derives its power from a portion of the converter 20. Although the ballast of illustrated embodiment includes the inverter for operating the lamp 1, the present invention should not be necessarily limited thereto and may not require the inverter for operating a particular type of the discharge lamp.

The igniter 60 includes a transformer with a primary winding 61 and a secondary winding 62 which is connected in series with the lamp 1 in a path of feeding the inverter output. Connected across the primary winding 61 is a series combination of a capacitor 64 and a discharge gap switch 65 which is responsible for discharging the capacitor 64 so as to induce a high igniting voltage at the secondary winding 62 for applying it to ignite the lamp.

The capacitor 64 is charged by the booster 50 which makes the use of a voltage appearing in the circuit of the converter 20 to provide a boosted DC voltage sufficient for rapidly charging the capacitor 64. The booster 50 is configured as a Cockcroft-Walton voltage multiplier composed of diodes, capacitors, and resistors. The booster 50 has its input connected across the diode 26 of the converter 20 and generates the boosted DC voltage from the voltage across the diode 26. Thus configured booster 50 provides the boosted DC voltage which will increase rapidly as the switching frequency of the switching element 24 increases. The booster may be of another configuration such as using a transformer or the like.

The controller 70 is provided to regulate the output DC power of the DC-DC converter 20 mainly by a closed-loop control, i.e., in a feedback manner based upon the converter's output in order to provide a starting lamp voltage at the lamp start and an operating lamp voltage after the lamp is started. The controller 70 is also configured to provide a sufficient lamp current immediately after the lamp is ignited without relying upon the feedback control for complementing the lamp start and proceeding the lamp start successfully to the stable rated lamp operation. Thus, the controller 70 provides an open-loop control which overrides or interrupts the closed-loop control only within a limited time period P1 immediately subsequent to the lamp start.

Figure 2:
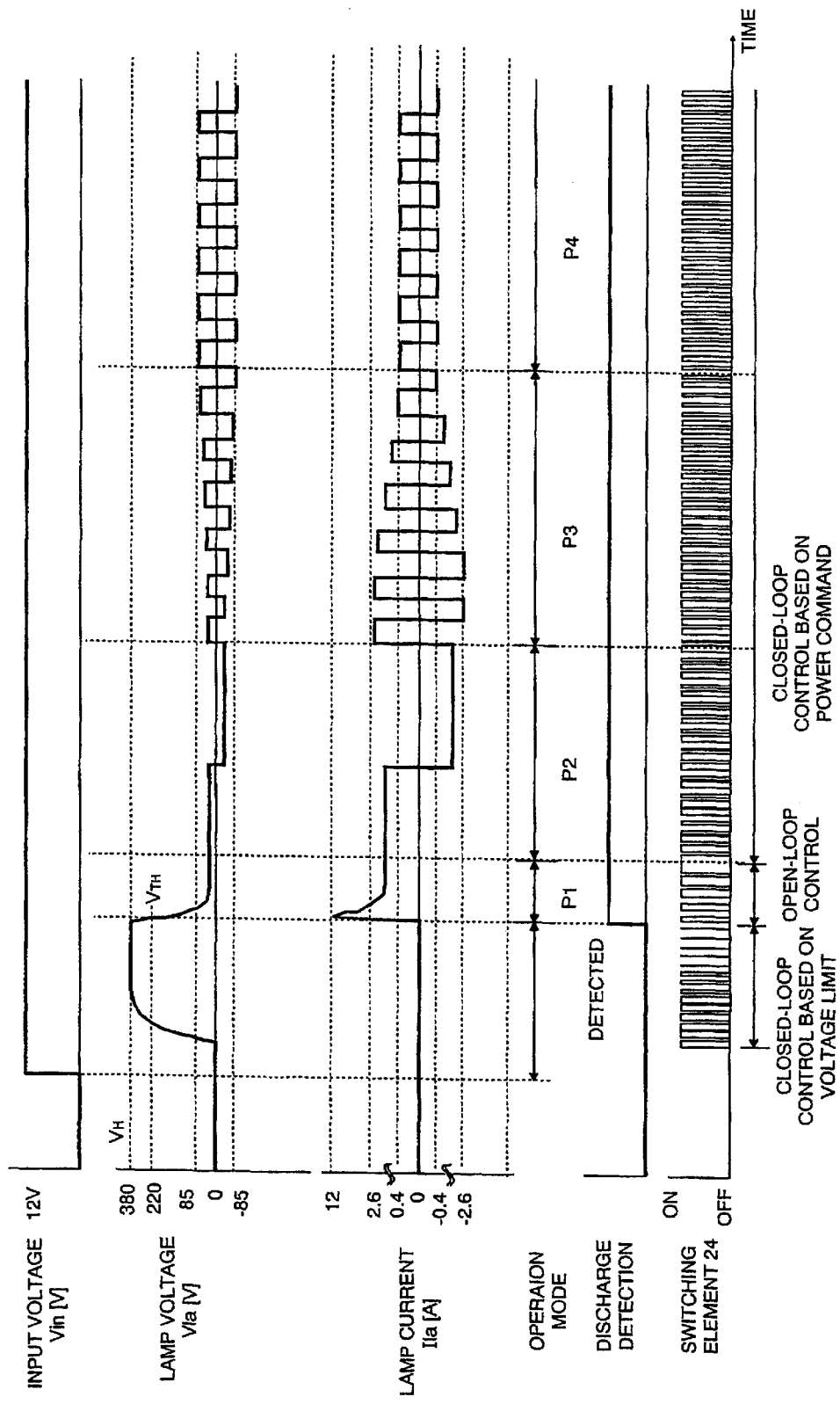
FIG. 2 is a waveform chart illustrating a general operation of the ballast.

FIG. 2 shows typical characteristics of the lamp voltage and the lamp current being supplied to start and keep operating the lamp. When the DC-DC converter 20 is energized with the lamp being off, the controller 70 makes the closed-loop control of increasing the output voltage of the DC-DC converter 20 from zero to the lamp starting voltage of about 380 V, for example, and maintaining the starting voltage until the lamp is ignited. Until then, the booster 50 provides to the igniter 60 sufficient high voltage for igniting the lamp. As soon as the igniter 60 ignites the lamp to start discharging of the lamp, which is normally made within 20 milliseconds, for example, from the energization of the DC-DC converter 20, the lamp voltage Vla sees an abrupt decrease. This is acknowledged by the voltage lowering down to a threshold voltage $V_{TH}$ of 220 V, for example. As soon as the voltage lowering is acknowledged by the controller 70, the open-loop control overrides the closed-loop control to provide a start-assisting period P1 in which a sufficient lamp current is supplied without a delay which would otherwise occur if the closed-loop continues, thereby complementing the lamp start and proceeding the lamp start successfully to the stable lamp operation.

Figure 3:
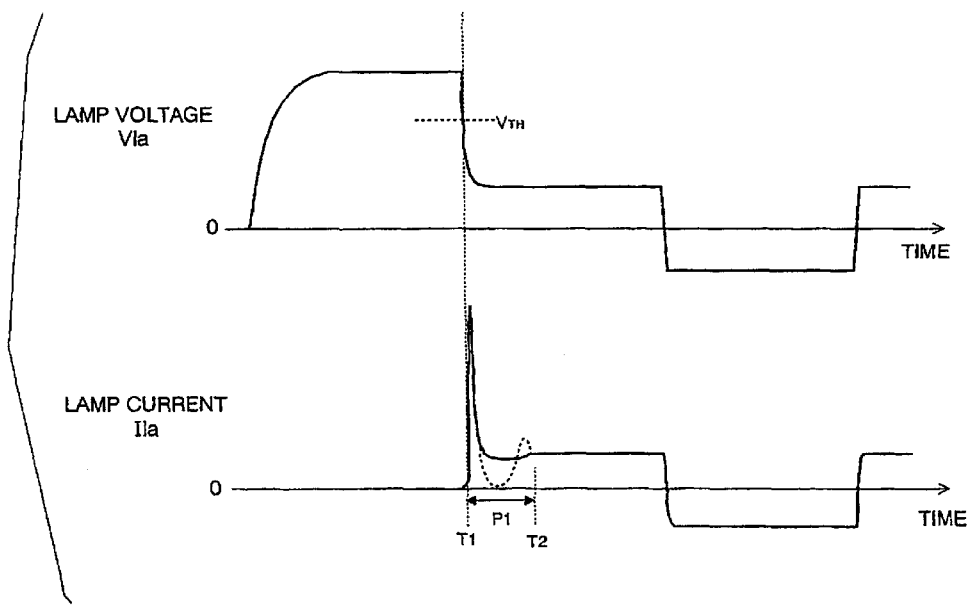
FIG. 3 is a waveform chart illustrating a lamp voltage curve and a lamp current curve intended to be generated by the ballast.

The start-assisting period P1 is selected to a fixed value, for example 300 $\mu$s, that is longer than a response time in which the closed-loop control would respond to provide a feed-back current based upon the output DC power of the DC-DC converter 20. That is, as shown in FIG. 3, if the closed-loop controls is still active to respond to the output DC power monitored at the time T1 when the output DC voltage lowers to the threshold voltage $V_{TH}$, there would be a certain delay in providing the feedback current truly reflective of the instant output power. Therefore, the closed-loop control could only provide an insufficient and erroneous feedback current, as indicated by dotted lines in FIG. 3, which reflects the output power, i.e., the high output voltage monitored before it lowers to the threshold $V_{TH}$. In contrast, the open-loop control of the present invention is made active upon the output DC voltage lowering to $V_{TH}$, thereby providing a sufficient lamp current, as indicated by a solid line in FIG. 3, without delay and assuring the reliable lamp start free from undesired lamp extinction that would be fairly possible with the insufficient lamp current as indicted by dotted line in FIG. 3.

After the open-loop control is completed, the closed-loop control regains to provide the regulated DC output power such that the DC-DC converter 20 is cooperative with the inverter 40 to supply the lamp current Ila of a first pattern for a subsequent warm-up period P2 of about 15 to 75 milliseconds, for example, and then supply the lamp current Ila of a second pattern for a subsequent run-up period P3 of 0 to 60 seconds, for example, and finally supplies the lamp current Ila of a third pattern thereafter. As shown in FIG. 2, the first pattern in period P2 is characterized to flow the current of a relatively high level of about 0.4 to 2 A, for example, in one direction over about half of period P2 and then in the other direction in order to warm-up the lamp's electrodes sufficiently for preventing accidental extinction of the lamp, while the second pattern in period P3 is characterized to flow the current of a level gradually decreasing to about 0.4 A, for example, in order to increase the light intensity successfully to a destined level. The third pattern is provided to flow the current of about 0.4 A, for example, to maintain the rated lamp operation.

Turning back to FIG. 1, the detailed configuration of the controller 70 will be now explained. The controller 70 includes a drive pulse generator 80 which generates a drive pulse which is fed through the driver 25 to the switching element 24 in order to turn on and off the switching element 24 at varying on-periods and at varying frequencies. Also included in the controller 70 are an output voltage monitor 71 which monitors the output DC voltage as indicative of the lamp voltage, an output current monitor 72 which monitors the output current as indicative of the lamp current, an input current monitor 73 which monitors an input current flowing through the switching element 24. Each time the output DC voltage is detected at a comparator 74 to exceed an upper limit $V_H$, that is the lamp starting voltage of about 380 V, for example, the comparator 74 issues a stop signal to the drive pulse generator 80 which responds to turn off the switching element 24. Thus, the DC-DC converter 20 generates the output DC voltage which increases up to the lamp starting voltage after energization of the converter and is kept at the lamp starting voltage until the lamp is ignited, as shown in FIG. 2. Another comparator 75 is provided to compare the output DC voltage with the threshold $V_{TH}$ to issue a signal requesting the open-loop control as a consequence of that the lamp is just started.

The controller 70 further includes a power command table 90 which stores a predetermined power command designating a power command upon which the closed-loop control relies to regulate the output DC power. The power command is fed together with the monitored output DC voltage to a current commander 91 which calculates a current command I from an equation of I=P/V (where P=power command, V=monitored DC voltage). Thus obtained current command is fed to an error amplifier 92 where it is compared with the monitored output current to provide a target current command $I_{P1}$ through a proportional and integration process. The target current command $I_{P1}$ is processed to drive the switching element 24 in order to regulate the output DC power in match with the target power command. In detail, the drive pulse generator 80 includes a trigger 81 which is connected to receive a pulse train from a PWM generator 94 and provides a trigger signal upon seeing a rising edge of the pulses. The trigger signal is fed through an AND-gate 82 to a set terminal of an RS flip flop 83 which responds to turn on the switching element 24 through another AND-gate 84, provided that the comparator 74 provides to the AND-gate 82 a high-level output indicative of that the output DC voltage does not exceeds the upper limit $V_H$ or the lamp starting voltage. The switching element 24 is turned off either when the RS flip-flop 83 is reset by a high-level output from a comparator 85 as indicative of that the monitored input current, i.e., the current flowing through the switching element 24 exceeds the target current command $I_{P1}$ converted through a D/A converter 86 into a corresponding analog value, or when the AND-gate 84 sees the failing edge of the pulse from the PWM generator 94 whichever comes earlier. Thus, the closed-loop control is made to drive the switching element 24 basically at a fixed frequency determined by the pulse from the PWM generator 94 but with varying on-periods of the switching element 24.

The closed-loop control is interrupted by the open-loop control only for the short time period P1 immediately subsequent to the output voltage lowering to the threshold voltage $V_{TH}$. For this purpose, the controller 70 includes an open-loop control interrupter 100, and a selector 101. The interrupter 100 provides an interrupt request when receiving a low-level output from the comparator 75 indicative of that the output DC voltage firstly lowers to the threshold voltage $V_{TH}$ as a result of the initiation of the lamp discharging. The interrupt request is latched and no interrupt request is issued after the elapse of the period P1. The selector 101 is provided to switch between the closed-loop control and the open-loop control under the control of the interrupter 100, and is configured to output a selective one of the target current command $I_{P1}$ from the error amplifier 92 and a current limit $I_{P2}$ of a predetermined pattern supplied from a current-limit commander 102. That is, as long as the interrupt request is issued from the interrupter 100, the selector 101 is set to output the current limit $I_{P2}$ to the drive pulse generator 80 to make the open-loop control of feeding the current not exceeding the current limit $I_{P2}$. Otherwise, the selector 101 delivers the target current command $I_{P1}$ to make the closed-loop control using the command.

Figure 4:
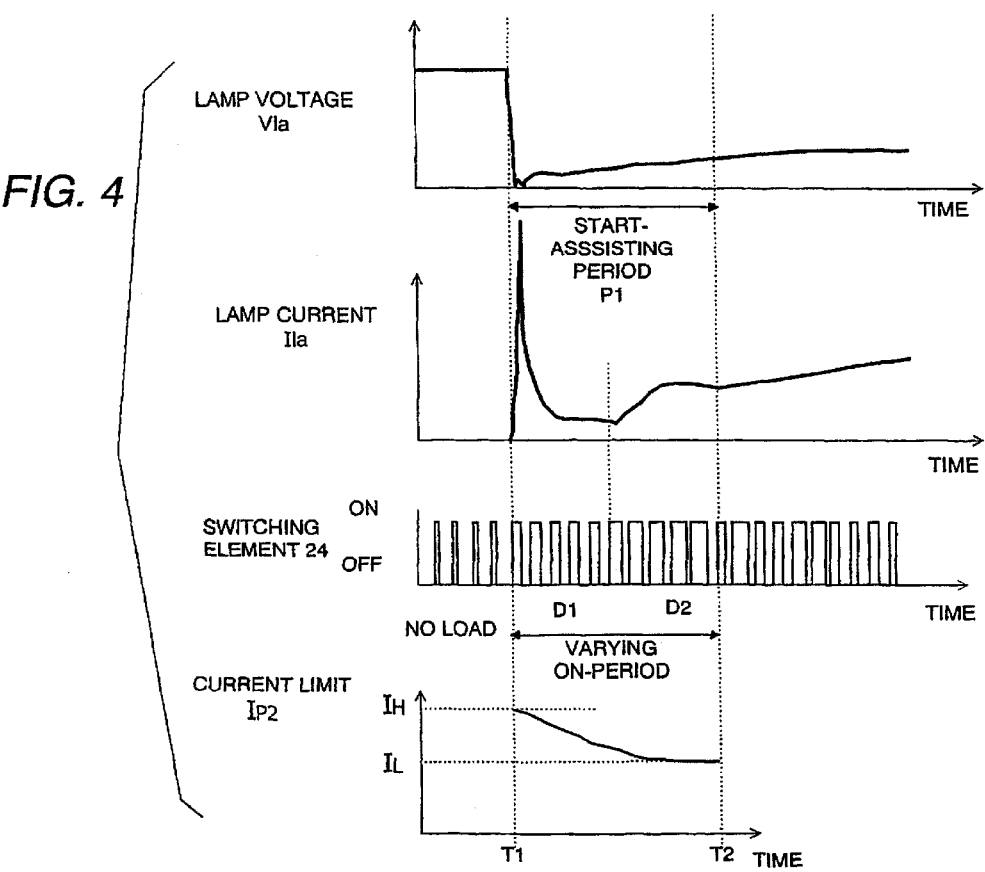
FIG. 4 is a waveform chart illustrating a basic operation of the ballast.
Figure 5A:
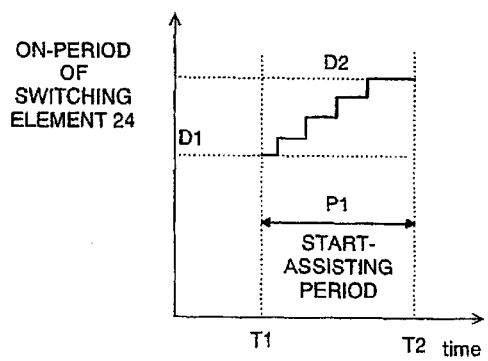
FIGS. 5A and 5B are charts illustrating alternative manners for regulating an output power of the ballast with an open-loop control.
Figure 5B:
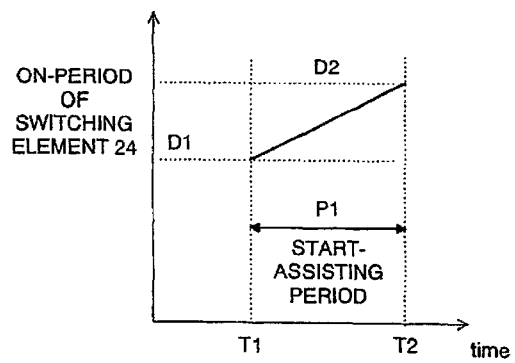

With the interrupt request is issued, the interrupter 100 activates a frequency allocator 103 and an on-period allocator 104 respectively to allocate predetermined patterns of the frequency and the on-period of the switching element 24 upon which the PWM generator 94 generates the corresponding pulse train for use in the drive pulse generator 80 to make the open-loop control. The frequency in the open-loop control is fixed at, for example, at 80 kHz, while the on-period increases D1 to D2 with time T1 to T2 during the start-assisting period P1, as shown in FIG. 4, in order to increase the lamp current later in the start-assisting period P1 for successfully complementing the lamp start. The on-period may have a pattern of increasing stepwise from D1 to D2 with the elapse of time from T1 to T2, as shown in FIG. 5A, or may have another pattern of increasing continuously from D1 to D2, as shown in FIG. 5B. Although not illustrated in the figure, frequency may be controlled to increase with time during the start-assisting period P1 instead of or in combination with the varying on-period. In this connection, the current limit may be set to have a pattern of decreasing from $I_H$ to $I_L$ with time within the start-assisting period P1, as shown in FIG. 4.

Figure 6:
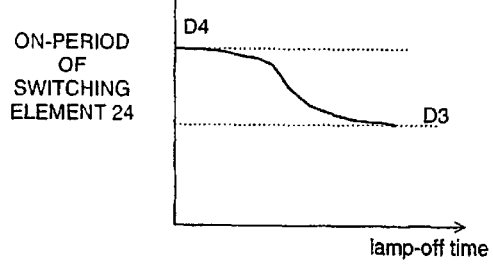
FIG. 6 is a chart illustrating an operation of the ballast.

Again turning back to FIG. 1, the controller 70 further includes a lamp-off time calculator 110 which gives a lamp-off time elapsed from the turn-off of the lamp in cooperation with a charge-discharge circuit 112 and a lamp-off monitor 114. The charge-discharge circuit 112 includes a capacitor (not shown) which is charged by a voltage $V_{DD}$ supplied from a dedicated voltage source 120 derived from the input DC voltage source 10 through the voltage source 121. The lamp-off monitor 114, in response to the lamp being turned on, actuates to start charging the capacitor of the charge-discharge circuit 112 and, in response to the lamp being turned off, actuates to start discharging the capacitor. Based upon the voltage across the capacitor, the lamp-off calculator 110 calculates the lamp-off time and sends it to the interrupter 100 which responds to modify the on-period of the switching element 24 to be driven during the start-assisting period P1. As shown in FIG. 6, the on-period is modified to decrease from D4 to D3 as the lamp-off time increases. Thus, when the lamp is re-started shortly after the turn-off of the lamp, the lamp can be supplied with a large current sufficient for re-starting the lamp. Since the still hot lamp just being turned off requires more power to restart than at a normal cold start condition, the above scheme is particularly advantageous for successfully re-starting the lamp. As a matter of course, the lamp-off time can be measured by any other technique other that that disclosed herein.

Figure 7A:
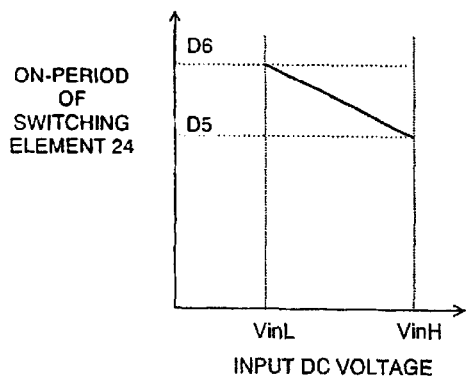
FIGS. 7A and 7B are charts illustrating parameters varying with an input DC voltage of the ballast, respectively.
Figure 7B:
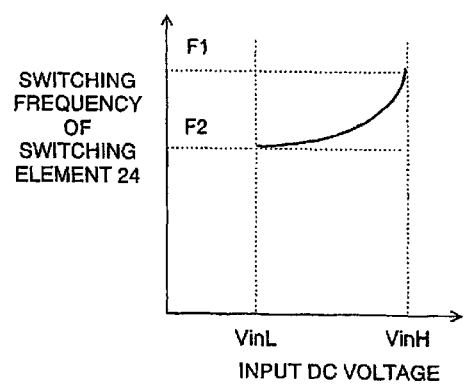
Figure 8:
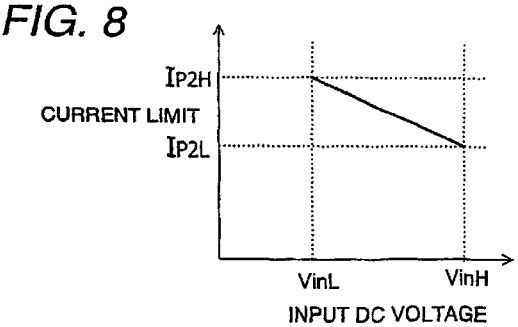
FIG. 8 is a chart illustrating the current limit varying with the input DC voltage.

The controller 70 further includes an input DC voltage monitor 130 which provides a monitored input DC voltage to the interrupter 100 which responds to actuate the on-period allocator 104 and the frequency allocator 103 in order to adjust the on-period as well as the frequency of the switching element 24 during the start-assisting period P1 in compensation for a possible variation of the input DC voltage. That is, the on-period is set to increase from D5 to D6 as the input DC voltage lowers within a tolerable range between VinL to VinH, as shown in FIG. 7A, while the frequency is set to decrease from F1 to F2 as the input DC voltage lowers within the tolerable range, as shown in FIG. 7B. Accordingly, the DC-DC converter 20 can supply more lamp current as the input DC voltage lowers, assuring to complement the lamp start successfully. Although the illustrated embodiment shows to vary both of the on-period and the frequency, it is equally possible to vary at least one of the on-period and the frequency. In this connection, the interrupter 100 may also actuate the current-limit commander 102 in order to increase the current limit from $I_{P2L}$ to $I_{P2H}$ as the input DC voltage lowers within the tolerable range, as shown in FIG. 8.

In addition, the controller 70 further includes a lamp-on monitor 132 which constantly monitors the output DC voltage of the DC-DC converter 20 to provide a lamp-on signal indicative of that the lamp is already on when the output DC voltage is within a predetermined reference voltage range, for example, 40 to 100 V. In response to the lamp-on signal, an inverter controller 140 is activated to generate an inverter control signal which determines the frequency of the switches 41 to 44 of the inverter 40. Then, the inverter control signal is fed to a drive signal generator 141 which actuates the driver 45 to turn on and off switches 41 to 44 at the intended frequency. Thus, the AC voltage is applied to the lamp from time T2 immediately subsequent to the start-assisting period P1, proceeding the lamp into a rated lamp operation phase P4 through the warm-up phase P2 and the run-up phase P3, as shown in FIG. 2.

Figure 9:
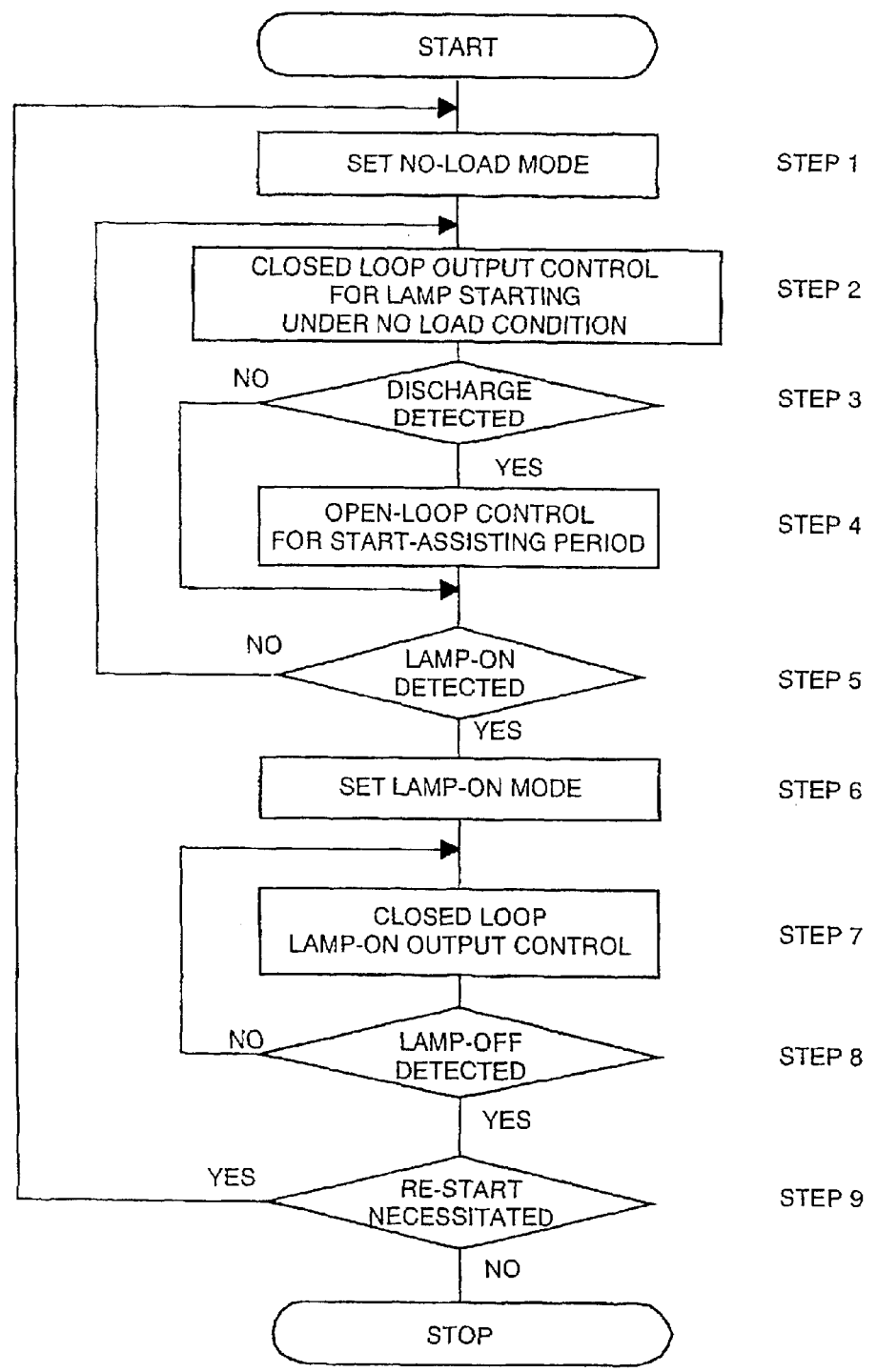
FIG. 9 is a flow chart illustrating an operation sequence of the ballast.

The open-loop control interrupter 100 is integrated together with some other components of the controller 70 into a microcomputer and includes a sequence controller 200 which is programmed to execute an operational sequence as shown in FIG. 9. The sequence starts upon energization of the ballast. At this time, the sequence controller 200 acknowledges from the output of the lamp-on monitor 132 that the lamp is not started, i.e., no load is connected to the ballast, so as to set a "no-load mode" (step 1). With the no-load mode, the sequence goes to a "closed loop output control for lamp starting" (step 2) which enables the closed loop control of increasing the output voltage to the lamp starting voltage, i.e., the maximum voltage $V_H$ defined by the comparator 74, for example, 380 V, as shown in FIG. 2. When the lamp is ignited while the starting lamp voltage is kept at the lamp starting voltage, there is seen an abrupt lowering of the output DC voltage due to the initiation of the discharge of the lamp. The discharge is detected by the corresponding lowering of the output DC voltage down to the threshold voltage $V_{TH}$, for example, 220 V. Upon seeing the lowering voltage from the output of the comparator 75 (step 3), the controller 200 enables the interrupter 100 to override the closed-loop control and allows the open-loop control over the start-assisting period P1 in order to provide the sufficient lamp current as discussed in the above (step 4). After the start-assisting period P1 is terminated, the closed-loop control regains to provide the output DC voltage for keeping the lamp on. At this time, the controller 200 checks in cooperation with the lamp-on monitor 132 whether the lamp is still on (step 5). When lamp is on, a lamp-on mode is set (step 6) to continue the closed loop of providing the output DC current for keeping the lamp on (step 7).

Figure 10:
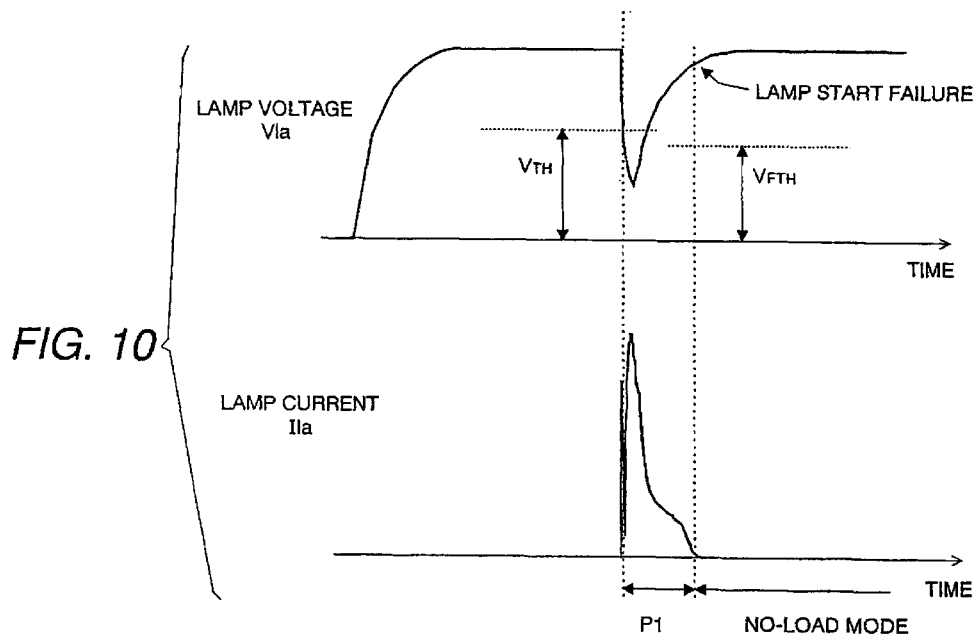
FIG. 10 is a waveform chart illustrating an re-starting operation of the ballast.

During the closed-loop control, it is constantly made to check whether the lamp becomes off (step 8). If the lamp is off, the controller 200 judges whether or not the re-starting of the lamp is necessary (step 9). If judged unnecessary, the control is terminated to stop operating the ballast. Otherwise, a sequence goes back to step 2 for re-starting the lamp. For example, when there is no lamp-on signal from the lamp-on monitor 132 and at the same time there is detected some low output voltage below the above reference voltage range utilized for determination of the lamp-on, the controller 200 judges that there is some critical failure in the lamp or the ballast due to ground-fault or short-circuiting, and determines that the re-starting is not necessary and stops operating the ballast. In contrast, when the there is no lamp-on signal and no such low output voltage indicative of the failure of the lamp or the ballast, the controller 200 responds to re-start the lamp through steps 1 to 4. When the discharge of the lamp is not detected at step 3, the open-loop control is skipped and the sequence goes back through step 5 to step 2 for attempting to start the lamp. For this purpose, the lamp-on monitor 132 is configure to provide a start-failure signal to the controller 200 when the output DC voltage is higher considerably than the reference range utilized to judge the normal lamp-on. That is, the output DC voltage is compared with a failure threshold voltage $V_{FTH}$ close to the threshold voltage $V_{TH}$ for determination of the lamp discharge, so that the lamp-on monitor 132 provides the start-failure signal when the output DC voltage exceeds the failure threshold voltage $V_{FTH}$, whereby the controller 200 again executes the step 2 to increase the output DC voltage ready for starting the lamp. If the lamp should fail to start even with the start-assisting period P1 commenced as a result of the lamp discharge detection, as shown in FIG. 10, the output DC voltage would increases in the subsequent closed-loop control towards the upper limit during which the output DC voltage exceeds the above failure threshold voltage $V_{FTH}$. Upon this occurrence, the controller 200 acknowledges that the lamp is not on at step 5, rendering the sequence back to step 2 for starting the lamp again.

Second Embodiment

Figure 11:
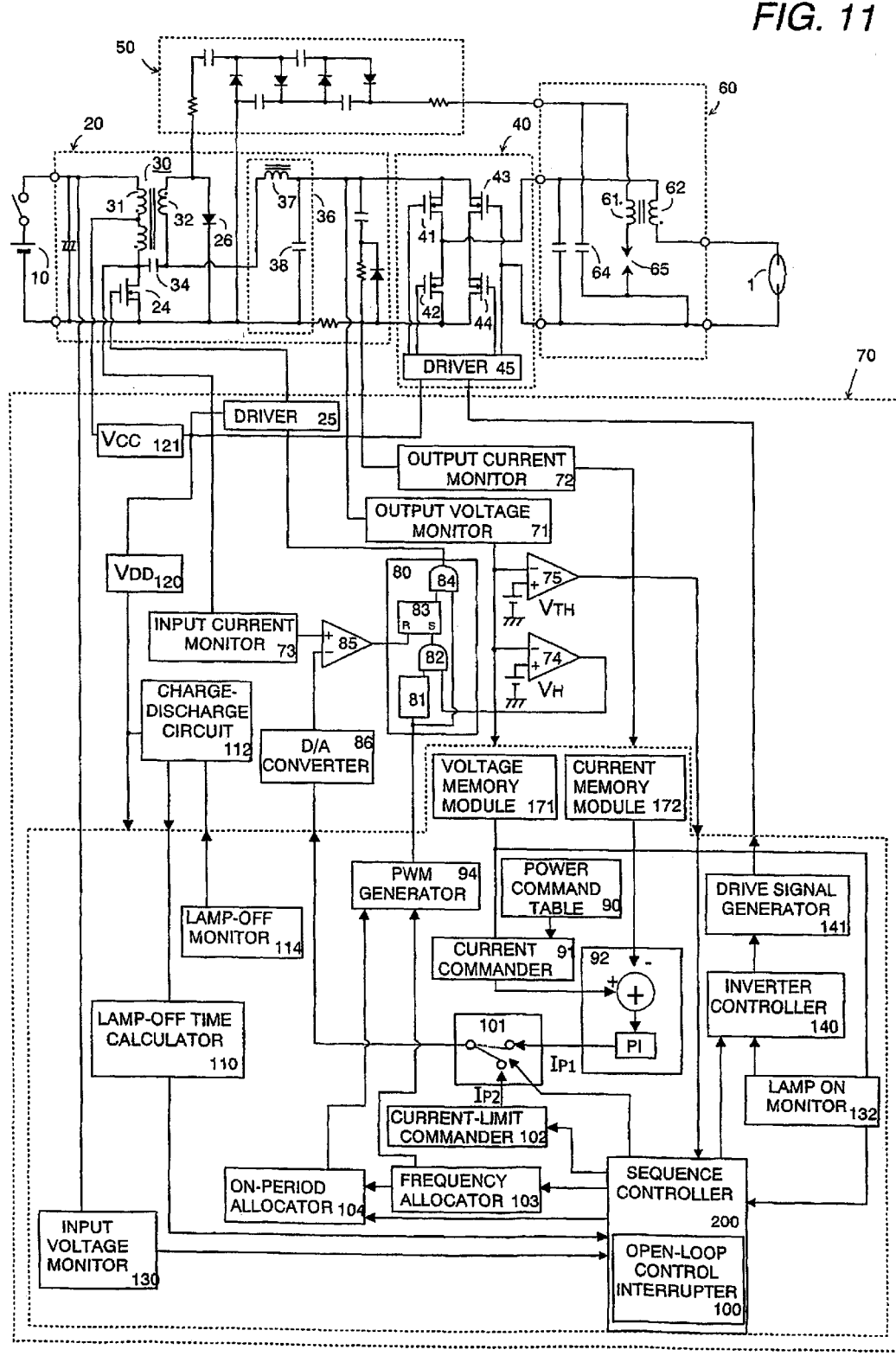
FIG. 11 is a circuit diagram illustrating another ballast in accordance with a second embodiment of the present invention.

FIG. 11 shows another ballast in accordance with a second embodiment of the present invention which is identical in configuration and operation to the first embodiment except for an addition of memory modules 171 and 172 for storing monitored output DC voltage and the current, respectively. Like parts are designated by like reference numerals for an easy reference purpose. Each of the memory modules 171 and 172 is configured to have a plurality of memories each storing voltage and current sampled at short time intervals, and a filter which processes the values from the memories to provide a suitably weighted value for improving the closed-loop control. Thus, when the closed-loop control regains subsequent to the open-loop control, it can immediately rely upon the weighted values of the output DC voltage and currents which are well reflective of the converter's output during the start-assisting period and give a reliable basis for the closed-loop control of optimally regulating the output DC power, thereby enabling smooth transition of the lamp start towards the rated lamp operation. The weighted values can also provide the reliable basis for the continued closed-loop control.

Third Embodiment

Figure 12:
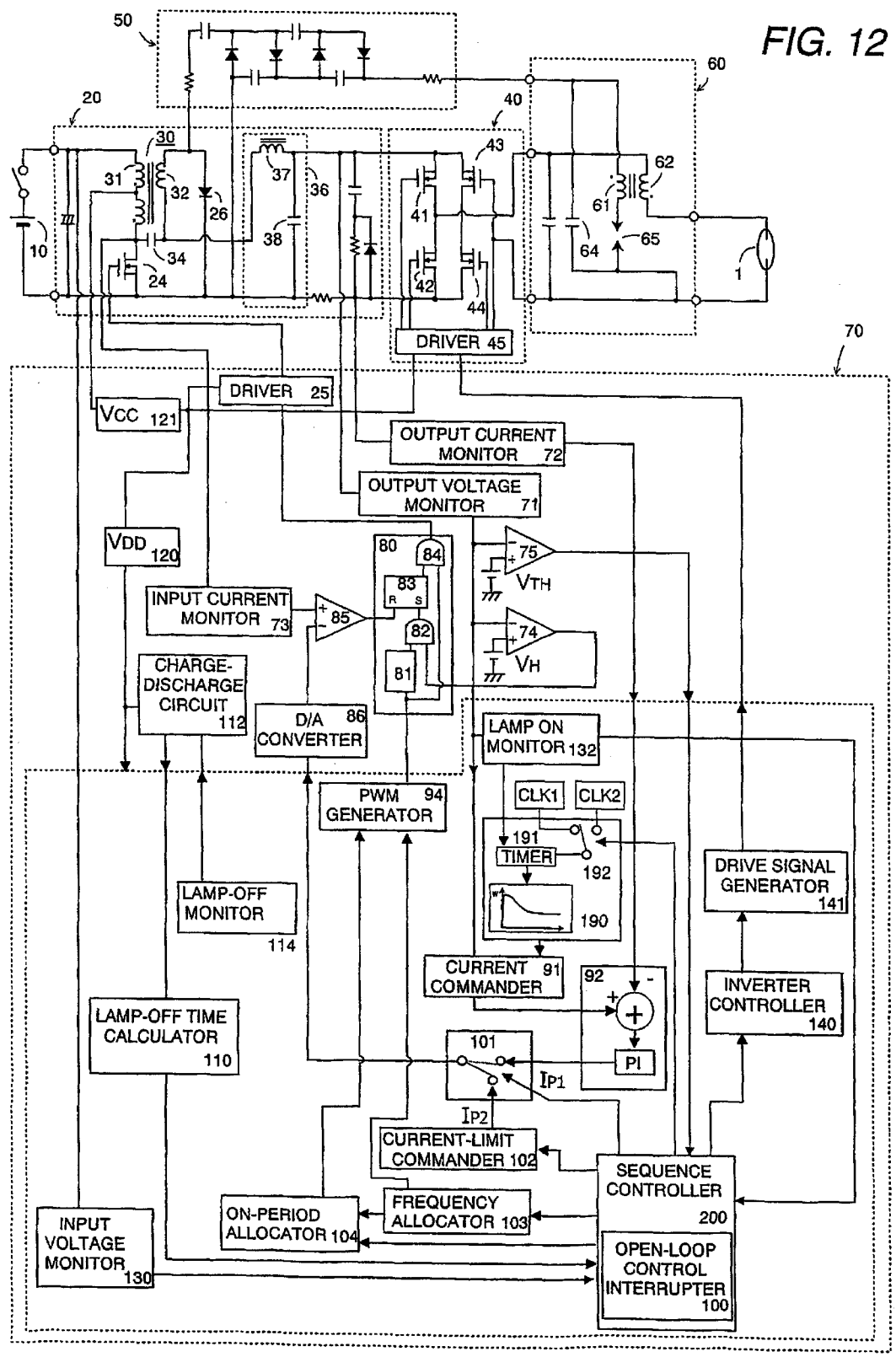
FIG. 12 a circuit diagram illustrating a further ballast in accordance with a third embodiment of the present invention.

FIG. 12 shows a further ballast in accordance with a third embodiment of the present invention which is identical in configuration and operation to the first embodiment except that an improved power command table 190 is provided. Like parts are designated by like reference numerals. The table 190 includes a pattern of the power command which is processed in the current commander 91 in order to provide the current command based upon the equation of I=P/V (where P=power command, V=monitored DC voltage) for making the closed-loop control in cooperation with the error-amplifier 92 where the resulting current command is compared with the monitored output DC current to give the target current command $I_{P1}$. Also included in the table 190 is a timer 191 which starts counting time upon energization of the ballast in order to create the pattern of the power command, i.e., draw the patterns shown in FIGS. 13A and 13B, as a function of the counted time, and is reset when receiving the interrupt request from the interrupter 100 as a result of that the lamp discharge is acknowledged, i.e., the open-loop control is enabled. As seen in the figure, the power command is defined to decrease from a maximum power command Wmax down to a rated power Ws with the counted time. It is noted that an initial higher level portion of the power command is intended to supply a relatively large lamp current in the warm-up period P2 immediately subsequent to the start-assisting period P1 for smoothly and successfully proceeding the lamp start to the rated lamp operation, as discussed hereinbefore with reference to FIG. 2. Thereafter, the closed-loop control is made based upon the lowered power command Ws which is a rated power command for keeping the rated lamp operation.

Since the timer is reset only in response to the interruption request to give the high power command at the beginning of the closed-loop control subsequent to the open-loop control, it is made possible to prevent the converter from generating high output if the open-loop control should be skipped. This is advantageous for protection of the lamp as well as the ballast in case the lamp fails to start due to the short-circuiting or ground-fault of the ballast, yet retaining to provide the sufficient lamp current when the closed-loop control follows the open-loop control. In this connection, it is noted the controller 200 includes a fault-detector which monitors the output DC voltage of the converter 20 and stops the operation of the ballast when the monitored output DC voltage lowers below a critical level indicative of an abnormal condition. In this regard, it is assured that, when the lamp should fail to start, the converter 20 would not rely on the initial high power command but on the lowered rated power command Ws to thereby generate the moderate output DC voltage such that the fault-detector can correctly acknowledge the abnormal condition for immediate protection of the lamp and the ballast. On the other hand, if the closed-loop control would otherwise rely upon the high power command, the converter 20 would generate the high output DC voltage which could certainly mislead the fault-detector to thereby delay the protection and possibly damage the lamp and the ballast.

Figure 13A:
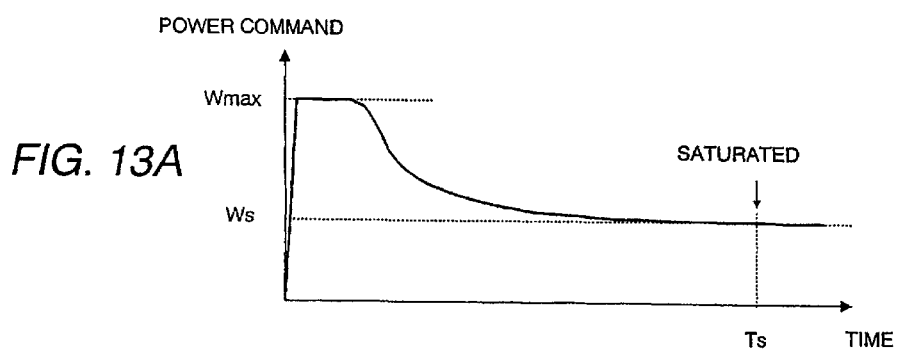
FIGS. 13A and 13B are charts illustrating the operations of the ballast.
Figure 13B:
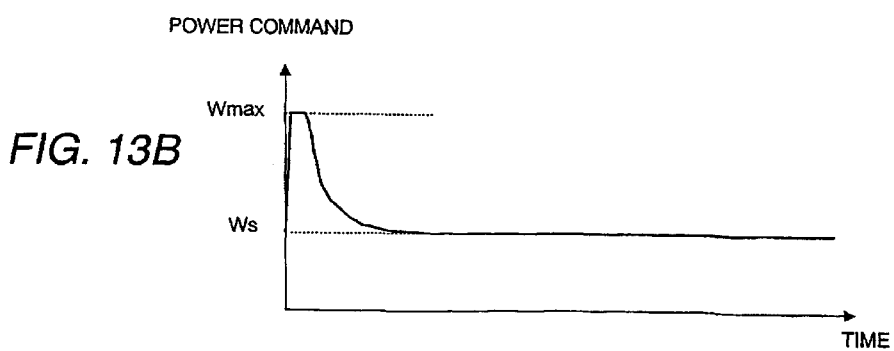

The timer 191 is connected through a clock selector 192 to selectively receive a first clock signal CLK1 and a second clock signal CLK2 of which frequency is higher than that of the first clock signal CLK1. Normally, the timer 191 operates to count time using the first clock signal CLK1. However, when no interrupt request is issued from the interrupter 100, the timer 191 receives the second clock signal CLK2 to thereby accelerate the lowering of the power command from Wmax to Ws, as shown in FIG. 13B. Thus, the first pattern of the power command of FIG. 13A is modified to create the second pattern of the power command which decreases to the rated power command Ws more quickly that the first pattern. With this accelerating scheme, it is made to minimize a possibility of the high power command being relied upon by the closed-loop control not associated with the open-loop control, thereby improving the immediate detection of the abnormal condition, while making the best use of the first pattern of the power command for creating the second pattern of the power command.

Although the above scheme of accelerating to lower the power command is preferred, it is still possible to make the above protection without switching the clock signals from CLK1 to CLK2 where the high power command is only required for a relatively short time period. This is because that the timer 191 is not reset in the absence of the interrupt request so that the closed loop control relies on the power command already being lowered with the elapse of counted time, as can be seen in FIG. 13A in which the power command is saturated to Ws after the elapse of certain counted time Ts.

Further, instead of switching the clock signals to accelerate the lowering of the power command upon seeing no interrupt request, the power command table 190 may be configured to give a fixed power command which is equal or less than the rated power command Ws when the closed-loop control is made without being interrupted by the open-loop control. Thus, the abnormal condition can be detected equally immediately.

This application is based upon and claims the priority of Japanese Patent Application No. 2001-005704, filed in Japan on Jan. 12, 2001 and No. 2001-215722 filed in Japan on Jul. 16, 2001, the entire contents of which are expressly incorporated by reference herein.

What is claimed is:

1. A ballast for a discharge lamp comprising:
   a DC-DC converter adapted to receive an input DC voltage from a DC voltage source, said DC-DC converter including a switching element which is driven to repetitively switch said input DC voltage to provide a variable DC output being applied to drive said discharge lamp;
   a controller which monitors the DC output and provides a closed-loop control of varying a duty cycle of said switching element based upon the monitored DC output in order to regulate the DC output such that the DC-DC converter provides a starting voltage of initiating a discharge of said discharge lamp as well as an operating voltage of keeping the operation of said discharge lamp;

wherein said controller provides an open-loop control which interrupts said closed-loop control to give a start-assisting period in which the switching element is controlled to turn on and off in a predetermined pattern to give said DC output of a sufficient level for successfully complementing the starting of said discharge lamp, said start-assisting period starting upon recognition that the DC output satisfies a first reference indicative that the discharging of said discharge lamp is just started and ending upon recognition of a condition indicative of the completion of the starting of said discharge lamp.

2. The ballast as set for in claim 1, wherein said controller terminates said start-assisting period after the elapse of a predetermined time from the beginning of the said start-assisting period.

3. The ballast as set forth in claim 2, wherein said predetermined time is selected such that a current supplied from the DC-DC converter to the discharge lamp sees no abrupt change when said closed-loop control regains immediately subsequent to said open-loop control.

4. The ballast as set forth in claim 2, wherein said start-assisting period is longer than a response time in which the closed loop control responds to operate upon the monitored DC output.

5. The ballast as set forth in claim 1, further including an input DC voltage monitor which monitors said input DC voltage supplied from said DC voltage source, said controller operating in said start-assisting period to lower an on-period of said switching element as said monitored input DC voltage increases.

6. The ballast as set forth in claim 1, further including an input DC voltage monitor which monitors said input DC voltage supplied from said DC voltage source, said controller operating in said start-assisting period to increase a switching frequency of said switching element as said monitored input DC voltage increases.

7. The ballast as set forth in claim 1, wherein said controller operating in said start-assisting period to increase an on-period of said switching element with time.

8. The ballast as set forth in claim 7, wherein said controller increases the on-period of said switching element in a stepwise manner.

9. The ballast as set forth in claim 1, further including a lamp-off timer which measures an elapsed time after said discharge lamp is turned off, said controller operating in said start-assisting period to increase an on-period of said switching element as the elapsed time decreases.

10. The ballast as set forth in claim 1, further including a memory which stores the monitored DC output updated during said start-assisting period, said controller relying upon the updated DC output when said closed-loop control regains in order to regulate the DC output.

11. The ballast as set forth in claim 1, further including a first detector which monitors an output level of said DC output and issues a first status signal indicating that the discharging of the lamp is just started when the output level satisfies said first reference, and a second detector which monitors the output level of said DC output and issues a second status signal indicating that the discharge lamp is already started when the output level satisfies a second reference which is different from said first reference, said controller operating to enable said open-loop control followed by said closed-loop control when both of the first and second status signal are issued, said controller operating to disable said open-loop control and make only the closed-loop control when the second status signal is issued in the absence of said first status signal.

12. The ballast as set forth in claim 11, wherein said first reference is a voltage level of said DC output and is lower than a maximum voltage applied prior to starting the lamp, and said second reference is a voltage level which is lower than said first reference.

13. The ballast as set forth in claim 11, wherein said controller provides a first pattern of a power command upon which the closed-loop control relies to regulate the DC output when both of the first and second status signal are issued, said first pattern defining the power command decreasing to a predetermined level with time, said controller providing a second pattern of the power command upon which the closed-loop relies to regulate the DC output when the second status signal is issued in the absence of said first status signal, said second pattern defining the power command which is different from that defined by said first pattern and which decreases to a predetermined level with the time.

14. The ballast as set forth in claim 13, wherein said second pattern of the power command is prepared by modifying said first pattern so as to define the power command varying with time and decreasing at a rate greater than said first pattern.

15. The ballast as set forth in claim 11, wherein said controller provides a first pattern of a power command upon which the closed-loop control relies to regulate the DC output when both of the first and second status signal are issued, said first pattern defining the power command decreasing with time, said controller providing a second pattern of the power command upon which the closed-loop relies to regulate the DC output when the second status signal is issued in the absence of said first status signal, said second pattern defining the power command which is fixed at a level not greater than a rated power level.

16. The ballast as set forth in claim 1, further including an input current detector which monitors an input current flowing through said switching element, said controller having a function of limiting said input current with reference to said monitored input current, said controller selecting a first upper limit for limiting said input current therebelow in said open-loop control and selecting a second upper limit for limiting said input current therebelow in a rated lamp operation, said first upper limit being higher than said second upper limit.

17. The ballast as set forth in claim 16, wherein said first upper limit in said open-loop control decreases with time.

18. The ballast as set forth in claim 16, further including an input DC voltage monitor which monitors an input DC voltage supplied from said DC voltage source, said controller providing said first upper limit which decreases as the monitored input DC voltage increases.

19. A method of operating a discharge lamp with the use of a DC-DC converter, said converter being adapted to be receive an input DC voltage from a DC voltage source and including a switching element which is driven to repetitively switch said input DC voltage to provide a variable DC output being applied to drive said discharge lamp;

said method comprising the steps of:

monitoring the DC output and making a closed-loop control of varying a duty cycle of said switching element based upon the monitored DC output in order to regulate the DC output such that the DC-DC converter provides a starting voltage of initiating a discharge of said discharge lamp as well as an operating voltage of keeping the operation of said discharge lamp;

making an open-loop control which interrupts said closed-loop control to give a start-assisting period in which the switching element is controlled to turn on and off in a predetermined pattern to give the DC output of a sufficient level for successfully complementing the starting of said discharge lamp, and starting said start-assisting period upon recognition that the DC output satisfies a first reference indicative that the discharging of said discharge lamp is just started and ending said start-assisting period upon recognition of a condition indicative of the completion of the starting of said discharge lamp.

\* \* \* \* \*

UNITED STATES PATENT AND TRADEMARK OFFICE
CERTIFICATE OF CORRECTION

PATENT NO. : 6,693,393 B2
DATED : February 17, 2004
INVENTOR(S) : Hirofumi Konishi et al.

It is certified that error appears in the above-identified patent and that said Letters Patent is hereby corrected as shown below:

<u>Title page,</u>
Item [57], ABSTRACT,
Line 9, change "not expected" to -- not be expected --.

<u>Column 10,</u>
Line 49, change "configure" to -- configured --.
Line 62, change "increases" to -- increase --.

<u>Column 12,</u>
Line 39, delete "that".

<u>Column 15,</u>
Line 8, delete "be".

Signed and Sealed this

Thirteenth Day of July, 2004

JON W. DUDAS
*Acting Director of the United States Patent and Trademark Office*